| United States Patent [19] | [11] Patent Number: 4,873,042 |
|---|---|
| Topcik | [45] Date of Patent: Oct. 10, 1989 |

[54] PROCESS FOR EXTRUDING A THERMOPLASTIC COPOLYMER

[75] Inventor: Barry Topcik, Bridgewater, N.J.

[73] Assignee: Union Carbide Chemicals and Plastics Company Inc., Danbury, Conn.

[21] Appl. No.: 173,148

[22] Filed: Mar. 25, 1988

[51] Int. Cl.$^4$ .................... B29C 35/02; B29C 47/78; B29C 71/00

[52] U.S. Cl. ............... 264/211.24; 264/236; 264/347; 525/209; 525/262; 525/263; 525/288; 525/387

[58] Field of Search .............. 264/211.24, 236, 347; 427/212, 421, 430.1; 525/209, 262, 263, 288, 387

[56] References Cited

U.S. PATENT DOCUMENTS

| | | | |
|---|---|---|---|
| 3,075,948 | 1/1963 | Santelli | 525/263 |
| 3,225,018 | 12/1965 | Zutty | 525/209 X |
| 3,455,752 | 7/1969 | Gray et al. | 264/236 X |
| 4,006,283 | 2/1977 | MacKenzie, Jr. et al. | 525/387 |
| 4,089,917 | 5/1978 | Takiura et al. | 264/236 X |
| 4,138,462 | 2/1979 | Procida et al. | 264/347 |
| 4,209,484 | 6/1980 | Denis et al. | 264/236 X |
| 4,289,860 | 9/1981 | Glander et al. | 525/263 |
| 4,412,042 | 10/1983 | Matsuura et al. | 525/262 X |
| 4,413,066 | 11/1983 | Isaka et al. | 521/149 |
| 4,528,155 | 7/1985 | Elder | 264/236 X |
| 4,574,133 | 3/1986 | Umpleby | 524/147 |
| 4,593,071 | 6/1986 | Keogh | 525/288 |

FOREIGN PATENT DOCUMENTS

| | | | |
|---|---|---|---|
| 120501 | 10/1984 | European Pat. Off. | |
| 120503 | 10/1984 | European Pat. Off. | |
| 2448861 | 4/1975 | Fed. Rep. of Germany | 264/236 |
| 2419209 | 11/1975 | Fed. Rep. of Germany | 264/236 |
| 2851434 | 6/1979 | Fed. Rep. of Germany | 264/236 |
| 48-4478 | 2/1973 | Japan | 264/236 |
| 53-120770 | 10/1978 | Japan | 264/236 |
| 56-43331 | 4/1981 | Japan | 264/347 |
| 57-119410 | 7/1982 | Japan | 264/236 |
| 59-80439 | 5/1984 | Japan | 264/211.24 |

*Primary Examiner*—Jeffery Thurlow
*Assistant Examiner*—Leo B. Tentoni
*Attorney, Agent, or Firm*—Saul R. Bresch

[57] ABSTRACT

A process for extruding a hydrolyzable particulate thermolastic copolymer coated with an organic peroxide, which, under extrusion conditions, will provide essentially no crosslinking per se, but will decompose to provide a silanol condensation catalyst, including passing the coated copolymer through an extruder having a die at about its downstream end with the proviso that the extruder is operated under such conditions that (i) the temperature of the extruder before the die is maintained at a level sufficient to extrude the copolymer, but below the decomposition temperature of the organic peroxide; (ii) the temperature of the extruder at or after the die is maintained at or above the decomposition temperature of the peroxide; and (iii) there is sufficient moisture in the environment to crosslink the copolymer in the presence of a silanol condensation catalyst.

7 Claims, No Drawings

PROCESS FOR EXTRUDING A THERMOPLASTIC COPOLYMER

TECHNICAL FIELD

This invention relates to a process for the extrusion of hydrolyzable thermoplastic copolymers.

BACKGROUND ART

It is well known that, at extrusion temperatures, silane modified hydrolyzable thermoplastic copolymers are prone to scorch or to show incipient crosslinking in the presence of silanol condensation catalysts. Generally, the silane modified copolymer is preblended with a catalyst masterbatch and then the blend is introduced into an extruder at temperatures of 100° to 250° degrees Centigrade. In some situations, the masterbatch is mixed into the resin in the extruder. In any case, within this temperature range, condensation reactions initiate which lead to scorch or premature crosslinking. When scorch occurs, the extrudate begins to show lumps of partially crosslinked polymer. At this point, the extruder must be stopped and cleaned, and the extrudate discarded.

DISCLOSURE OF THE INVENTION

An object of this invention, therefore, is to provide an extrusion process in which premature crosslinking is essentially avoided.

Other objects and advantages will become apparent hereinafter.

According to the present invention, the above object is met by a process for producing a crosslinked thermoplastic copolymer which comprises:
  (a) introducing a hydrolyzable particulate thermoplastic copolymer, which is coated with an effective amount of an organic peroxide crosslinking compound, into an extruder having an inlet and an outlet and an extrusion die at its outlet end;
  (b) mixing the coated copolymer within the extruder at a temperature below the decomposition temperature of the peroxide compound; and
  (c) extruding the resultant mixed copolymer through the die at a temperature within the die and/or in the vicinity of the outlet of the die, which is at or above the decomposition temperature of the peroxide, and in the presence of sufficient moisture to effect crosslinking of the copolymer.

More particularly, the process for extruding the hydrolyzable particulate thermoplastic copolymer comprises (i) coating the copolymer with an organic peroxide, which, under extrusion conditions, will provide essentially no crosslinking per se, but will decompose to provide a silanol condensation catalyst; (ii) passing the coated copolymer through an extruder having a die at about its downstream end; (iii) maintaining the temperature of the extruder before the die at a level sufficient to extrude the copolymer, but below the decomposition temperature of the organic peroxide; (iv) maintaining the temperature of the extruder at or after the die at or above the decomposition temperature of the organic peroxide; and (v) providing sufficient moisture in the environment to crosslink the copolymer in the presence of a silanol condensation catalyst.

DETAILED DESCRIPTION

The hydrolyzable thermoplastic copolymers useful in subject process derive their hydrolyzability from silane modification. They are commercially attractive because they can be simply and effectively cured with water. These copolymers are, therefore, susceptible to a broad range of processing conditions and are particularly useful in the preparation of extruded wire coatings, foams, and pond liners.

The curing or crosslinking of these silane modified copolymers is effected by exposing the copolymers to moisture. The moisture in the atmosphere is usually sufficient to permit curing to occur over a period of up to 48 hours, especially when a silanol condensation catalyst has been added to the copolymer; however, the moisture cure is more effectively carried out by soaking the resin in a water bath.

It is understood that the term "copolymer" as used in this specification includes silane grafted olefin homopolymers and copolymers and copolymers of silane and one or more olefin monomers. The silane modified copolymers are generally extrudable at lower temperatures than the silane modified homopolymers and, therefore, are preferred in subject process. The monomers on which the homopolymers and copolymers are based are generally alpha-olefins or diolefins having 2 to 20 carbon atoms and particularly the lower alpha-olefins having 2 to 12 carbon atoms. Preferably, a major proportion, i.e., more than 50 percent by weight, of each copolymer is attributed to ethylene, propylene, or 1-butene. The silane monomer, which is either grafted or copolymerized, is unsaturated and has at least one hydrolyzable group. Various useful vinyl alkoxy silanes are mentioned below.

In addition to the alpha-olefin, diolefin, and silane monomers, the balance of the copolymer can be based on one or more various olefin monomers having 2 to 20 carbon atoms as long as a thermoplastic copolymer is the result. Examples of useful monomers are the vinyl esters, alkyl methacrylates, and alkyl acrylates. Examples of these compounds are 1-hexene, 4-methyl-1-pentene, 1-undecene, ethyl acrylate, vinyl acetate, methyl methacrylate, 1,4-hexadiene, ethylidene norbornene, dicyclopentadiene, butyl acrylate, and methyl acrylate. Silane modified terpolymers such as ethylene/propylene/ethylidene norbornene rubbers are of particular interest.

Silane grafted copolymers can be prepared by the technique described below. In this copolymer, the portion attributed to the silane is present in an amount of about 0.5 percent to about 10 percent by weight based on the weight of the copolymer and is preferably incorporated into the copolymer in an amount of about 0.5 to about 4 percent by weight. The silane used to modify the copolymer can be among others, a vinyl trialkoxy silane such as vinyl trimethoxy silane, vinyl triethoxy silane, or vinyl isopropoxy silane. Generally speaking, any unsaturated monomeric silane having one or more hydrolyzable groups can be used. If slower water cure or better shelf stability is desired, vinyl triisobutyoxy silane or vinyl tris-(2-ethyl-hexoxy) silane can be used.

A free radical generator or catalyst is used in the preparation of the silane grafted copolymer. Among the most useful free radical generators are dicumyl peroxide, lauroyl peroxide, azobisisobutyronitrile, benzoyl peroxide, tertiary butyl perbenzoate, di(tertiary-butyl)-peroxide, cumene hydroperoxide, 2,5-dimethyl-2,5-di(t-butylperoxy)hexyne, 2,5-dimethyl-2,5-di(t-butylperoxy)hexane, tertiary butyl hydroperoxide, and isopropyl percarbonate. The organic peroxides are preferred.

About 0.001 to about 5 percent by weight of free radical generator based on the weight of the polymer or copolymer is used, preferably about 0.001 to about 0.05 percent by weight.

A typical technique for preparing a silane grafted polyethylene is as follows: the polyethylene used can be, for example, a low density polyethylene having a density of 0.90 and a melt index of 1.0. It can be made by the processes described in European patent applications Nos. 0 120 501 and 0 120 503, both published on Oct. 3, 1984 and incorporated by reference herein, wherein ethylene is polymerized together with an alpha olefin comonomer having 3 to 8 carbon atoms, or by other conventional techniques. In the present application, low density polyethylenes are considered to include copolymers of ethylene and a minor proportion of alpha olefin. 100 parts of ethylene copolymer, 0.2 part of polymerized 1,3-dihydro-2,2,4-trimethylquinoline (an antioxidant), 0.1 part of dicumyl peroxide, and 4 parts of vinyl tri-2-ethyl-hexoxy silane are mixed in a laboratory Brabender mixer at a temperature in the range of about 80° C. to about 115° C., a temperature low enough to keep the dicumyl peroxide below its decomposition temperature. After mixing for five minutes, the temperature is raised to a temperature in the range of about 150° C. to about 220° C. The batch is then mixed for 5 to 10 minutes during which grafting of the silane to the polyethylene occurs. The antioxidant is used as a radical trap to control the amount of crosslinking. This technique can be repeated, for example by using 3 parts of vinyl-triisobutoxysilane and 0.1 part of the antioxidant, tetrakis [methylene(2-5-di-tert-butyl-4-hydroxyhydro-cinnamate]methane; initial mixing is in the range of 110° C. to 120° C.; grafting is for 5 minutes at 185° C.

A copolymer of ethylene and silane can be prepared by the process described in U.S. Pat. No. 3,225,018 issued on Dec. 21, 1965 or U.S. Pat. No. 4,574,133 issued on Mar. 4, 1986, both of which are incorporated by reference herein. The portion of the copolymer attributed to the silane is in the range of about 0.5 to about 10 percent by weight based on the weight of the copolymer and is preferably in the range of about 0.5 to about 4 percent by weight.

Various other processes for preparing silane grafted copolymers and numerous unsaturated silanes suitable for use in preparing these polymers and bearing hydrolyzable groups such as alkoxy, oxy aryl, oxyaliphatic, and halogen are mentioned in U.S. Pat. Nos. 3,075,948; 4,412,042; 4,413,066; and 4,593,071, all of which are incorporated by reference herein.

As noted, the thermoplastic polymers are particulate, i.e. they are either in the granular state as produced in gas phase polymerization or in the form of pellets, which are prepared by extruding the granules.

The organic peroxide selected is one, which, under extrusion conditions, will provide essentially no crosslinking per se, but will decompose at a particular temperature to provide a silanol condensation catalyst. Since the extrusion rate is such that a granule or pellet of thermoplastic copolymer is not exposed to extrusion temperatures for more than one or two minutes, an organic peroxide with a half-life as low as 60 minutes at 125° C. can be used. A "half-life" of a peroxide at any specified temperature is the time required at that temperature to effect a loss of one half of the active oxygen content of the peroxide. The half-life is considered to be a measure of decomposition of the organic peroxide. This minimum half-life should insure that essentially no decomposition takes place before the die. The minimum half-life is set to accommodate temperatures sufficient for the extrusion of the thermoplastic polymer. These temperatures can be in the range of about 90° C. to about 135° C. A preferred range of temperatures in the zone prior to the die is about 90° C. to about 120° C. At the die or in the zone following the die, the temperature maintained is the decomposition temperature of the organic peroxide or a temperature higher than the decomposition temperature. This temperature is generally in the range of about 100° to about 220° C. and is preferably in the range of about 135° to about 200° C. It will be understood by those skilled in the art that the temperature ranges overlap because of the differences in decomposition temperatures of the various suitable organic peroxides, and, further, the decomposition temperature is usually a range of temperatures over which the organic peroxide decomposes. The objective is to avoid essentially all decomposition prior to the die.

Useful organic peroxides are tertiary butyl perbenzoate, tertiary amyl perbenzoate, ethyl-o-benzoyl lauryl-hydroximate, tertiary butyl peroxyneodecanoate, tertiary butyl peroxy-2-ethyl hexanoate, tertiary butyl peroxyisobutyrate, tertiary butyl peroxyacetate, tertiary butyl peroxymaleic acid; di-tertiary-butyl diperoxy-azelate; di-tertiary-butyl diperoxy-phthalate; oo-t-butyl-o-(2-ethyl hexyl)monoperoxy-carbonate; and 4,4-di-t-butyl peroxy n-butyl valerate. Ethyl-o-benzoyl laurylhydroximate is an especially preferred organic peroxide because it has a one hour half-life at 155° C. Generally, the benzoate, valerate, butyrate, and laurohydroximate peroxides are preferred. The benzoyl and benzoate based peroxides liberate benzoic acid which is a powerful silane condensation catalyst in the presence of moisture. To insure that the organic peroxide provides essentially no crosslinking, a radical trap such as a hindered phenolic antioxidant can be included with the organic peroxide, which is used to coat the resin.

The amount of organic peroxide, which will provide sufficient silane condensation catalyst to effect the moisture cure in a reasonable amount of time, is in the range of about 0.1 to about 5 parts by weight of organic peroxide per 100 parts by weight of copolymer. A preferred amount of organic peroxide is in the range of about 0.5 to about 3 parts by weight of organic peroxide for each 100 parts by weight of copolymer. The rate of cure is dependent on the temperature and thickness of the extrudate. The cure can be effected by providing a moist atmosphere or by immersion in water.

The organic peroxide used to coat the copolymer particles is preferably either a liquid or a low melting solid, which can easily be converted to the liquid form. While solutions of peroxides in various organic solvent such as acetone can be used, they are not desirable because when the solvent boils off, it sometimes leaves blisters on the extrudate. Coating can be accomplished by soaking or spraying, or by using some other conventional coating technique.

Various types of extruders can be used, e.g., a single screw type. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. If it has more than one barrel, the barrels are connected in series. The length to diameter ratio of each barrel is in the range of about 16:1 to about 30:1. For the purposes of this specification, it will be understood that the term "extruder" includes, in addition to conventional extruders, (i) injection molding apparatus, the die of the extruder being analogous to the injector of the injection molding apparatus and (ii) the combination of an extruder and a zone where foams are prepared. The zone follows the die and may be, for example, an oven. In wire coating, the die of the extruder is maintained at or above the decomposition temperature of the peroxide. In injection molding, the injector is maintained at the same temperature as the die in the wire coating operation. The mold, of course, is maintained at a low temperature, 40° C. or less. In a foaming operation, the die of the extruder is kept below the decomposition temperature of the peroxide, and the temperature is raised to the decomposition temperature of the peroxide in the zone where the foaming is to take place.

Conventional additives are added to the copolymer prior to its being coated with the organic peroxide. The amount of additive is usually in the range of about 0.01 to about 50 percent based on the weight of the resin. Useful additives are antioxidants, ultraviolet absorbers, antistatic agents, pigments, dyes, fillers, slip agents, fire retardants, plasticizers, processing aids, lubricants, stabilizers, and smoke inhibitors. Blends of the hydrolyzable thermoplastic copolymer and other polymers can be prepared in the extruder provided that the resins to be blended with the hydrolyzable copolymer will not crosslink. Examples of these resins are low density polyethylene, high density polyethylene, and polypropylene.

Advantages of the invention are (i) the elimination of scorch; (ii) the avoidance of catalyst masterbatches; (iii) the uniform distribution of the organic peroxide and thus the uniform distribution of catalyst; (iv) simplicity of processing as opposed to the difficulty encountered with mixing a relatively small amount of masterbatch into a large amount of resin; and (v) the catalyst is not in an active form until decomposition of the organic peroxide.

The invention is illustrated by the following examples:

EXAMPLES 1 AND 2

The following compositions are used in the examples:

| Example | 1 | 2 |
|---|---|---|
| | (parts by weight) | |
| ethylene/vinyl trimethoxy silane copolymer | 100 | — |
| ethylene/ethyl acrylate/ vinyl trimethoxy silane copolymer | — | 100 |
| p,p'-oxybis (benzene-sulfonyl hydrazide) | 2 | 2 |
| azodicarbonamide | 15 | 15 |
| t-butylperoxybenzoate | 1 to 2 | 2 |
| hindered phenolic antioxidant or 1,2-dihydro-2,2,4-trimethylquinoline | 2 | 2 |

The above compositions are separately mixed in a Brabender or Banbury Mixer. They are then pelletized and the pellets are soaked in t-butylperoxybenzoate. The coated pellets are extruded in an extruder similar to that described above to a sheet 0.15 inch thick. The temperature in the extruder before the die is 120° C., which is below the decomposition temperature of the organic peroxide. The same temperature is maintained at the die. The extruded sheets are then placed in an oven at 200° C. for 5 to 10 minutes where they expand and cure in a moist environment. The moist environment is provided in situ by the hydrazide, which releases about nine percent by weight water on decomposition. The density of the foam is 2.5 pounds per cubic foot.

What is claimed is:

1. A process for extruding a hydrolyzable particulate thermoplastic copolymer, comprising (i) coating the copolymer with an organic peroxide, which, will provide essentially no crosslinking per se, but will decompose to provide a silanol condensation catalyst; (ii) passing the coated polymer through an extruder having a die at its downstream end; (iii) maintaining the temperature of the extruder upstream of the die at a level sufficient to extrude the copolymer, but below the decomposition temperature of the organic peroxide; (iv) maintaining the temperature at the die or downstream of the die at or above the decomposition temperature of the organic peroxide; and (v) providing sufficient moisture at the die or downstream of the die to crosslink the copolymer in the presence of a silanol condensation catalyst.

2. The process defined in claim 1 wherein the copolymer particles are granules or pellets.

3. The process defined in claim 1 wherein the copolymer is a copolymer of one or more alpha-olefins and an unsaturated silane containing one or more hydrolyzable groups.

4. The process defined in claim 1 wherein the organic peroxide is a benzoate, valerate, butyrate, or laurylhydroxinate peroxide.

5. The process defined in claim 1 wherein the temperature of the copolymer before the die is in the range of about 90 to about 120 degrees Centigrade.

6. The process defined in claim 1 wherein the temperature of the copolymer at or after the die is in the range of about 135 to about 200 degrees Centigrade.

7. The process defined in claim 1 wherein the copolymer is produced from one or more comonomers, each having 2 to 20 carbon atoms.

* * * * *